United States Patent
Finck

(10) Patent No.: US 6,474,382 B1
(45) Date of Patent: Nov. 5, 2002

(54) TIRE WITH COLOR COMPOUNDS

(75) Inventor: François Finck, Clermont-Ferrand (FR)

(73) Assignee: Compagnie Generales des Establissements Michelin-Michelin & Cie (FR)

(*) Notice: Subject to any disclaimer, the term of this patent is extended or adjusted under 35 U.S.C. 154(b) by 0 days.

(21) Appl. No.: 09/474,231

(22) Filed: Dec. 29, 1999

Related U.S. Application Data

(63) Continuation of application No. PCT/EP98/03918, filed on Jun. 26, 1998.

(30) Foreign Application Priority Data

| Jul. 2, 1997 | (FR) | 97 08562 |
| Sep. 23, 1997 | (FR) | 97 11919 |

(51) Int. Cl.⁷ .................. B60C 1/00; B60C 11/00; B60C 13/04
(52) U.S. Cl. ............ 152/209.5; 152/524; 152/525
(58) Field of Search ............... 152/523, 524, 152/525, 209.5, 154.2, DIG. 12

(56) References Cited

U.S. PATENT DOCUMENTS

| 1,664,352 A | * | 3/1928 | Coleman | 152/209.5 |
| 2,130,524 A | * | 9/1938 | Clark | 152/209.5 |
| 2,224,141 A | * | 12/1940 | Clark | 152/209.5 |
| 4,003,420 A | | 1/1977 | Sandstrom et al. | 152/355 |
| 4,226,274 A | * | 10/1980 | Awaya et al. | 152/209.5 |
| 4,319,620 A | | 3/1982 | Knill | 152/209 R |
| 4,385,653 A | | 5/1983 | Okazaki et al. | 152/209 |
| 4,913,207 A | | 4/1990 | Harakon et al. | 152/209 R |
| 5,937,926 A | * | 8/1999 | Powell | 152/209.5 |

FOREIGN PATENT DOCUMENTS

| EP | 0557091 | 8/1993 |
| EP | 0576130 | 12/1993 |
| EP | 0864446 | 9/1998 |

OTHER PUBLICATIONS

Derwent Abstract, SU 1 243 957, Jul. 1996, 1 page.

* cited by examiner

Primary Examiner—Geoffrey L. Knable
(74) Attorney, Agent, or Firm—Baker Botts LLP

(57) ABSTRACT

A tire having a radial carcass reinforcement and a crown reinforcement composed of at least two crown plies and of inextensible reinforcing elements, preferably wire, crossed from one ply to the next by forming an angle with the circumferential direction that can range between 5° and 45°, and radially outside a tread, characterized in that said tread, composed of rubber compounds of different colors, is axially formed by at least three longitudinal parts, two lateral parts of rubber compound of a first color and, axially between said two parts, at least one rubber compound part of a second color other than black, each axial end A—visible outside—of the colored part with the second color being away from the end—situated on the same side relative to the equatorial plane of the tire—of the axially narrowest ply by a distance at least equal to 30 mm.

16 Claims, 1 Drawing Sheet

TIRE WITH COLOR COMPOUNDS

This is a continuation of PCT/EP 98/03918, filed Jun. 26, 1998.

BACKGROUND OF INVENTION

The present invention concerns a passenger vehicle tire whose outer surfaces are of different colors and, in particular, a tire presenting a color other than black on the sidewalls and at least one color other than black on the tread.

With the advent of rubber compounds containing silica as principal filler instead of carbon black, it is possible to make white and/or color compounds, other than black or white, by addition of coloring pigments. A compound of color other than black can be used as a single component of the tread, or in combination with a standard black compound and/or another color compound. In case of combination on a tread of compounds of different colors, and with a view to making the wear of said tread uniform, while maintaining a high level of wear potential, the chemical composition of the different rubber compounds should be studied accordingly.

The combination of several compounds of different compositions on the same tread is well known. Patent Application FR 2,611,600, in order to reduce the irregular wear of an airplane tire tread, without detriment to the need to strengthen the underlying reinforcement, proposes dividing said tread axially into three parts: two lateral parts, the constituent rubber compound of which has a modulus at 100° and at 100% elongation 30 to 80% lower than the modulus measured under the same conditions as the rubber compound constituting the central part.

Said combination can, in case said compounds are of different colors and said compounds are structurally arranged in any way, entail major problems with the lifetime of the radial tire, the latter containing a crown reinforcement made up of at least two crown plies of inextensible and crossed reinforcing elements radially surmounting a radial carcass reinforcement. In particular, complex phenomena of migration between compounds of certain constituent additives can harmfully influence endurance in separations between ends of said "crossed" crown plies of the radial tire, and/or separations between crown reinforcement and carcass reinforcement over a long lifetime of use of the tire.

SUMMARY OF THE INVENTION

In order to remedy said problems, the tire according to the invention, having a radial carcass reinforcement, a crown reinforcement composed of at least two crown plies of inextensible reinforcing elements, preferably wire, parallel to each other in each ply and crossed from one ply to the next by forming an angle with the circumferential direction that can range between 5° and 45° and radially outside a tread, composed of rubber compounds of different colors, and axially formed by at least three longitudinal parts, is characterized in that the two lateral parts of the tread, radially covering the axial ends of the crown plies whose reinforcing elements are crossed from one ply to the next by forming an angle with the circumferential direction that can range between 5° and 45°, consist of a rubber compound of a first color, axially between the said two parts, at least one part consisting of a rubber compound of a second color, different from the first and other than black, each axial end A—visible outside the tire—of the colored part with a second color being away from the end—situated on the same side relative to the equatorial plane of the tire—of the axially narrowest crown ply by a distance at least equal to 30 mm.

The best compromise between uniformity of wear and crown reinforcement endurance is obtained when the two lateral parts of the tread are black.

Between the two lateral parts there can be a single central part of a rubber compound of a second color, or also a central part axially connected to the two lateral parts of the first color by means of two intermediate parts, the colored part of the tread with a second color that can then be either one intermediate part or two intermediate parts, and the central part that can be of a first color, or of a color different from the second color of the intermediate parts.

The radial thickness of the compound of color other than black can have a value ranging between the total thickness of the tread, measured in the equatorial plane, and a value equal to the radial distance separating the tread surface from the radially outer surface of the wear indicators, placed at the bottom of the grooves. Said thickness, for reasons of ease and cost of manufacture, is advantageously equal to the thickness of the tread.

Improvement of the endurance of the crown reinforcement of such a tire can be completed by the presence, radially above the crown plies, of reinforcing elements crossed by at least one additional ply of circumferential reinforcing elements, the axial width of which ply is greater than the width of the widest "crossed" crown ply and said additional ply fulfilling two functions: a hooping function, as known, but also a migration screening function of the compounding additives and, in particular, of the antiaging additives, owing to its proper thickness and the composition of its liner.

It is particularly advantageous to use two plies of circumferential reinforcing elements for the above purposes, preferably of aliphatic polyamide, the two plies having widths greater than the width of the widest "crossed" crown ply. For maximum efficiency, the ply of axially narrowest circumferential elements will have a width equal to at least 105% of the width of the widest "crossed" crown ply, the latter being greater than the width of the contact surface between the road and the tread of the tire, inflated to working pressure and carrying its nominal load.

In order to have, on the one hand, a tread wear as regular as possible crosswise, in spite of the presence of at least two compounds of different composition and color, and, on the other, to minimize the risks of separation between products on the tread surface, the ends A—visible outside the tire—of the two axial edges of each part of second color will be located at the bottoms of circumferential grooves, axially delimiting said part of second color, said circumferential grooves preferably being longitudinal.

The color tire, according to the invention, has at least one of the sidewalls, at least partially, in a color other than black, with an arrangement of rubber compounds known per se, the color compounds axially outside being radially delimited by two sidewall protuberances axially projecting outside. The curvilinear distance separating the radially upper end of the colored sidewall compound from the axially outer end of the widest "crossed" crown ply is advantageously at least equal to 30 mm.

DESCRIPTION OF THE DRAWING

The characteristics and advantages of this invention will more clearly appear on reading of the specification which follows and by reference to the drawing in which the single FIGURE, seen in meridian section, shows a tire according to the invention.

DESCRIPTION OF PREFERRED EMBODIMENTS

Figure 1:
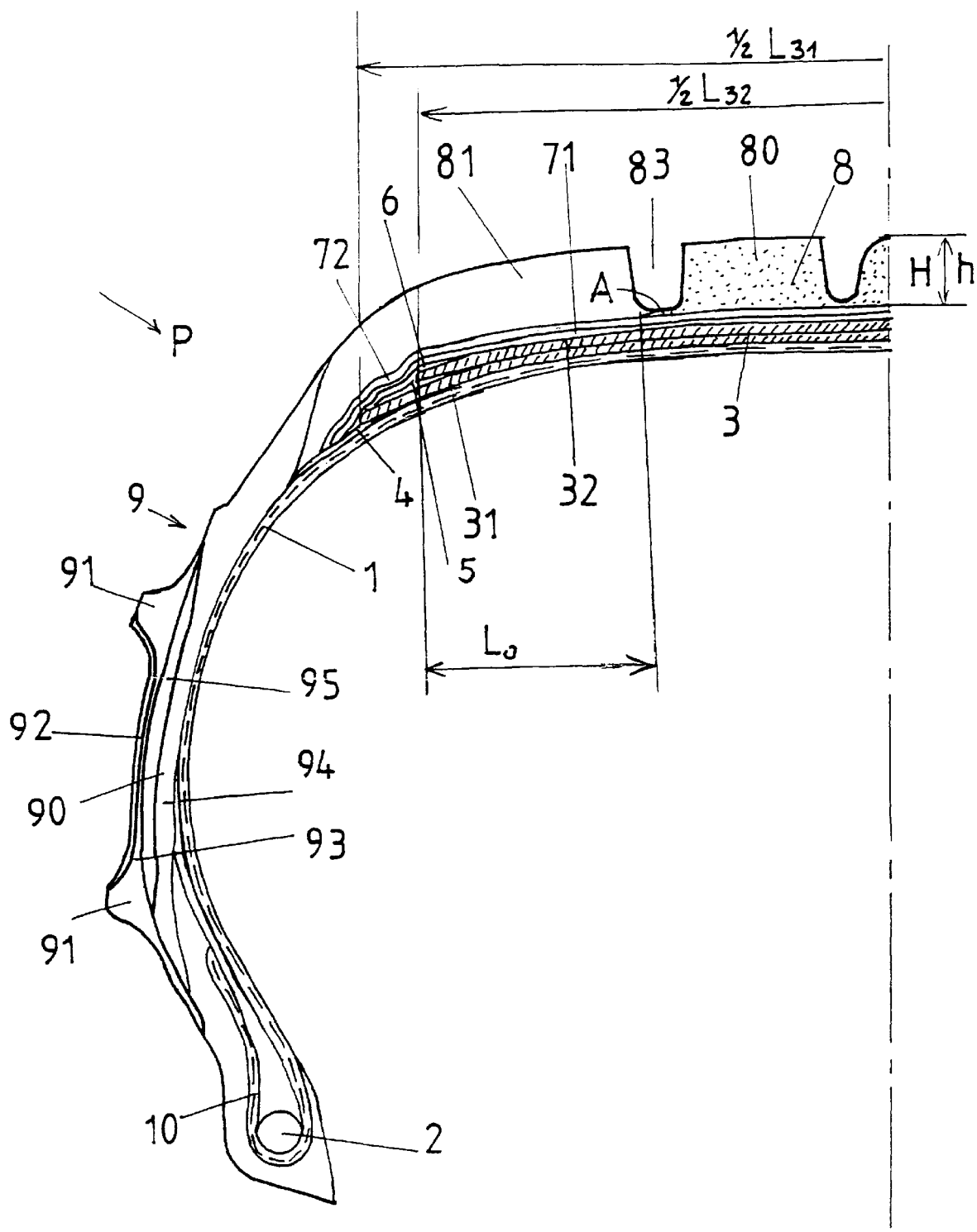

The tire P has a carcass reinforcement 1, consisting of two plies of radial polyester cords and anchored by a turn-up 10 to at least one wire 2 in each bead. The carcass reinforcement 1 is radially surmounted by a crown reinforcement 3 formed by two plies 31 and 32, reinforced by inextensible wires crossed from one ply to the next, the radially inner ply 31 having an axial width $L_{31}$ greater than the axial width $L_{32}$ of the radially outermost crown ply. In the example described of a tire of size 155/70.R.13, the width $L_{31}$ is equal to 123 mm. Width $L_{32}$ is less than $L_{31}$ and equal to 110 mm, while the axial width of the contact surface between the road and the tire, carrying its nominal load of 380 kg and inflated to its working pressure of 2.5 bars, is 109 mm. As known per se, each edge of the ply 31 is separated from the outermost carcass ply by a narrow rubber profile 4, the edges of plies 31 and 32, respectively, being separated from each other by a rubber border layer 5 of 0.5 mm thickness and the edges of the narrowest ply 32 also being radially coated with a border layer 6 of 0.5 mm thickness.

The abovementioned "crossed" ply and border rubber assembly is radially covered outside with two plies 71 and 72 of circumferential reinforcing elements, said elements being textile yarns of aliphatic polyamide coated in a liner compound suited to such yarns. The widths of the plies 71 and 72, equal to each other, exceed those of plies 31 and 32, so as to cover axially the edges of the widest "crossed" ply 31 of the crown reinforcement.

The tread 8, covering the set of plies, comprises three longitudinal parts: a central part 80 and two lateral parts 81. Said parts 81 are composed of a black rubber compound, the composition of which was chosen to possess wear properties roughly identical to the wear properties of the compound other than black constituting the central part 80. The axial edges of said central part 80 are such that the ends A of those edges, visible outside, are located at the bottom of longitudinal grooves 83 axially delimiting said central part 80. Each visible axial end of the central part A is away from the end of the narrowest "crossed" crown ply 32, situated on the same side relative to the meridian plane of the rubber ring other than black, by a distance $L_0$ equal to 35 mm, that is, 32% of the axial width $L_{32}$ of said ply 32.

As for the radial thickness h of the central part 80 other than black, it is, in the case described, equal to the height H of the tread 8, said thickness, measured in the equatorial plane, being the radial distance between the tread surface and the radially outermost crown ply.

The tread 8 is connected, on both sides of the equatorial plane, to the bead of the tire by a sidewall 9 also containing a color part. Said part 90, radially delimited by two protuberances 91, is composed, going from outside to inside, of a colored rubber compound layer 92 (black being excluded), axially adjacent to a rubber compound layer 93 more particularly resistant to a fracture initiation phenomenon, said layer 93 being in turn connected to a standard sidewall layer 94 by a rubber compound layer 95 intended to avoid to the maximum the migration of products from the layer 94.

I claim:

1. A passenger vehicle pneumatic tire comprising
   a radial carcass reinforcement,
   a crown reinforcement composed of at least two crown plies of inextensible reinforcing elements parallel to each other in each ply, the reinforcing elements being crossed from one ply to the next ply by forming an angle with the circumferential direction that can range between 5° and 45°, and
   a tread radially outside the crown plies, the tread comprising rubber compounds of different colors and axially formed by at least three longitudinal parts, two lateral parts radially covering the axial ends of the crown plies and at least one intermediate part axially located between the lateral parts and having an axial end A adjacent a lateral part and visible outside the tire,
   wherein said at least one intermediate part is composed of rubber comprising silica as a filler,
   wherein the lateral parts are each composed solely of a rubber compound of a first color and said at least one intermediate part is composed of a rubber compound of a second color different from the first color and other than black, and
   wherein the axial end A of said at least one intermediate part of a second color, situated on the same side relative to the equatorial plane of the tire, is separated from the adjacent axial end on said side of the equatorial plane of the axially narrowest crown ply by a distance at least equal to 30 mm.

2. A tire according to claim 1, characterized in that the two lateral parts of the tread are black.

3. A tire according to claim 1, characterized in that the tread is formed by three parts and the at least one intermediate part is a single central part being a rubber compound of a second color.

4. A tire according to claim 1, characterized in that the rubber compound part of second color, lying between the two lateral parts, is subdivided into two intermediate bands situated on both sides of the equatorial plane of the tire.

5. A tire according to claim 4, characterized in that the intermediate bands are joined axially by a central band of rubber compound of first color.

6. A tire according to claim 1, including, radially above the crown plies, at least one additional ply of circumferential reinforcing elements, said ply having an axial width greater than the width of the widest crossed crown ply.

7. A tire according to claim 1, including, radially above the crown plies, two additional plies having circumferential reinforcing elements, said plies having axial widths greater than the width of the widest crossed ply.

8. A tire according to claim 6, characterized in that the circumferential reinforcing elements are made of aliphatic polyamide.

9. A tire according to claim 7, characterized in that the circumferential reinforcing elements are made of aliphatic polyamide.

10. A tire according to claim 1, characterized in that the radial thickness of the rubber compound part of second color has a value equal at most to the total thickness H of the tread, measured in the equatorial plane, and a value at least equal to the radial distance separating the tread surface from the radially outer surface of any wear indicators placed at the bottom of the grooves.

11. A tire according to claim 10, characterized in that the radial thickness h of the part of second color is equal to the thickness H of the tread, said thickness, measured in the equatorial plane, being the radial distance between the tread surface and the radially outermost crown ply.

12. A tire according to claim 1, characterized in that the axial ends A of the rubber compound part of second color other than black, visible outside, are located at the bottoms of circumferential grooves axially delimiting said part.

13. A tire according to claim 12, characterized in that the circumferential grooves are longitudinal.

14. A tire according to claim 13, comprising sidewalls, at least one of the sidewalls including, at least partially, a color compound other than black, the color compound axially outside being radially delimited by two axially projecting sidewall protuberances.

15. A tire according to claim 14, wherein said color compound is axially adjacent a rubber compound layer, wherein said layer is more resistant to fractures than said color compound, said layer being in turn axially connected inside to a sidewall layer comprising a rubber composition by means of an intermediate rubber compound, wherein said intermediate rubber compound resists the migration of products from said color compound.

16. A tire according to claim 1 in which the inextensible reinforcing elements are wires.

* * * * *

UNITED STATES PATENT AND TRADEMARK OFFICE
CERTIFICATE OF CORRECTION

PATENT NO.    : 6,474,382 B1  Page 1 of 1
DATED         : November 5, 2002
INVENTOR(S)   : Finck, François It is certified that error appears in the above-identified patent and that said Letters Patent is hereby corrected as shown below:

<u>Title page,</u>
Item [73], Assignee, "Generales" should read -- Générale --; and
"Establissements" should read -- Etablissements --

Signed and Sealed this

Twenty-fourth Day of June, 2003

JAMES E. ROGAN
*Director of the United States Patent and Trademark Office*